PROCESS FOR TREATING EARTH FORMATIONS

Original Filed Aug. 24, 1964

INVENTOR:
CLIFFORD V. WITTENWYLER
BY: George H. Pritchard
HIS AGENT

United States Patent Office

Re. 26,625
Reissued July 15, 1969

26,625

PROCESS FOR TREATING EARTH FORMATIONS

Clifford V. Wittenwyler, Union, N.J., assignor to Shell Oil Company, New York, N.Y., a corporation of Delaware Original No. 3,368,625, dated Feb. 13, 1968, Ser. No. 391,442, Aug. 24, 1964. Application for reissue May 6, 1968, Ser. No. 729,874
Int. Cl. E21b *33/138*
U.S. Cl. 166—295 4 Claims

Matter enclosed in heavy brackets [ ] appears in the original patent but forms no part of this reissue specification; matter printed in italics indicates the additions made by reissue.

ABSTRACT OF THE DISCLOSURE

A method for consolidating unconsolidated earth formations by forming (1) an aromatic hydrocarbon composition having at least 80% aromatics and containing a polyepoxy resin, (2) a 50–70% aromatic containing hydrocarbon solvent containing a cycloaliphatic polyamine, blending compositions (1) and (2) in approximately equal volumes and optionally adding thereto up to 7% of a mixture of a phenol in a polar-containing solvent, and thereafter injecting and retaining the resulting blended mass into the formation until consolidation is achieved.

This invention relates to an improved process for preparing earth treating compositions, and more particularly for preparing compositions to be used for treating earth formations surrounding oil wells. In particular, it relates to the preparation of compositions used for treating preferentially water wetted earth formations surrounding oil wells to improve their permeability to oil and for consolidating unconsolidated or substantially unconsolidated formations such as loose sand, particularly surrounding oil wells while retaining a substantial degree of permeability to oil therein.

It is known in the production of petroleum from oil wells that the earth formations surrounding the borehole contain connate water and are preferentially water wetted. Such formations have a relatively low permeability to oil and thus reduce the rate at which oil can be produced through them from the surrounding oil bearing formation. This invention provides a method for treating such a preferentially water wetted formation to convert it to a preferentially oil wetted formation, thus increasing its permeability to oil and increasing the rate at which oil may be produced through such a formation.

Another problem which is sometimes encountered is the presence of an unconsolidated formation immediately surrounding the well borehole. It is known that the small sized particles of an unconsolidated formation, which are entrained by the fluid passing out of the formation and into a production well communicating therewith, remain suspended in the fluid and are produced at the well head, causing increased abrasion of metal parts and necessitating frequent clean-outs of production equipment, such as separators and tanks. Coarser particles entrained by the fluid flowing into the well are deposited on the bottom of the well, reducing the rate of production as the producing section of the well is plugged by the increasing mass of particles deposited therein. If the production rate becomes too low the well must be cleaned out before a new production cycle can begin. In some cases, the particles enter the well in such great quantities that it is not possible to produce the well economically.

In order to overcome these problems encountered in wells surrounded by unconsolidated earth formations, it has been suggested to consolidate the loose formation surrouding the well bore. One method of consolidation used is to coat the particles of the formation with a plastic material. The problem of consolidating a sand by means of a plastic coating is complicated and difficult. The majority of the sands are water wet and their pores contain droplets of oil surrounded by the water which is in contact with the grains. The connate water (water adhering to the sand grains due to capillary forces) in the sand is usually alkaline, and basic mineral materials, such as carbonates, often comprise a significant portion of whatever naturally occurring cementing materials exist between the grains of the sand. The unconsolidated sands are encountered at widely varying depths and exist at temperatures ranging from about 90° F. to 350° F. The variations in the permeability, and the variations in the size of tubing strings installed in the well interact to create wide variations in the time involved in pumping a liquid from a surface location into the sand encountered by the well.

These problems impose difficulties which are troublesome in respect to the conventional plastic sand consolidation treatment using resins of the phenol-formaldehyde type. The resins of this type are formed by reacting formaldehyde or formalin with an aryl hydroxy compound, such as phenol or cresol, in the presence of a catalyst. Suitable catalysts comprise water soluble acids, or bases, or stannous chloride, or a mixture of stannous chloride and an acid. Where the reactants are to be injected as the components of a solution, the phenol and the formaldehyde must be partially reacted to form an oily liquid phase in which those reactants, i.e., the partially cured resin and the catalyst, are mutually soluble. It is difficult to render sand grains preferentially wetted by a liquid phase, unless the liquid phase contains a material having the properties of preferentially wetting the sand grains. The stannous chloride catalyst, to some extent, exhibits this advantage over the basic catalysts, but has the disadvantage of reacting with components of the sand and thus losing its catalytic effect. Pretreating the sand with acids often fails to remove all of the reactive materials and also tends to dissolve naturally occurring cementing materials, thus increasing the amount of consolidation which is required.

One of the requirements of a good consolidation method is that it can be applied at the various temperatures which are to be expected in the formations. Further, it is required that the bond formed by the hardened resin between the particles or grains of the formation will be resistant to formation fluids and/or to chemicals injected into the formation, as well as to movements in the neighboring unconsolidated parts of the formation. On the other hand, the amount of resin required to give the formation the necessary mechanical strength should not excessively impair the permeability thereof so that a flow of fluids from the formation to the well, or vice versa, will remain possible. This is of utmost importance when consolidating formations having a low permeability.

It has been proposed to consolidate a porous earth formation such as one surrounding an oil well by treating said formation with a solution which deposits a resin on the sand grains of the formation. The resin forms a layer on the grains which after hardening causes the unconsolidated sand grains to become bonded together thereby forming a strong-oil resistant cement-like unit while retaining a substantial degree of permeability for oil.

A very desirable sand consolidation composition has been found to be resin-forming polyepoxide and an amine curing agent in a liquid solvent medium. Oftentimes a curing accelerator is also used with the polyepoxide. It is desirous to keep the resin product, which will begin to form immediately upon mixing the polyepoxide with the curing agent, in solution for a period of time while the entire composition is pumped into the well hole and injected between the grains of the earth formation being treated. Different resin-forming polyepoxides and amine curing agents have varied reaction rates which are also dependent on the temperature as well as the concentrations of curing agent and resin. It is very important that the type and concentration of polyepoxide, curing agent, solvent and promoter be carefully selected depending on the conditions encountered within the individual well. Where the well temperature is higher the resin composition will cure faster and become hard in a shorter time than when used in a cooler well. In a deeper well the time it takes to inject the resin composition is increased thus allowing a more complete curing of the resin before it reaches the earth formation to be consolidated. If the resin has cured so as to have begun to precipitate in the solvent it would tend to cause fracturing of the earth formation upon contact therewith. Not only is formation fracturing a problem of concern, but also plugging of the wall of the formation and even plugging of the borehole itself in deeper and warmer wells must be avoided. Thus, since the rate at which the epoxy compound reacts with the curing agent varies significantly with the temperature and since the period required to inject the reaction solution into the well and into the earth formation depends on the well depth as well as the injection rate, the period of time it takes the intermediate partially cured resinous product to separate out of solution has to be controlled within wide limits. In addition to finding the desired combination of epoxy compounds and curing agent as well as amount of curing accelerator to be used to suit the conditions encountered at any given well, the initial resin separation time varies according to the volume percentage of aromatic hydrocarbons in the solvent. Thus a mixture of solvents is used which contains a percentage of aromatics which is based on the individual well conditions and desirable separation times calculated for the well. The problems concerning the selection of epoxy compound and curing agent, combination and concentrations thereof, promoter and concentration thereof, and combination of solvents of the desired aromatic content in order to prepare a resin composition, that, when injected into the borehole of certain depth and temperature, will flow into the earth formation before the resin begins to separate out of solution and thereafter allow the resin to fully cure, thereby consolidating the earth formation as desired, become apparent. Even after deciding on the combination of reactants and solvents to be used for earth consolidation of a well hole, the components must be blended just prior to injection into the well. The problem of on-site blending is further aggravated in cold weather because epoxy compounds, promoters and curing agents may become quite viscous or even crystalline at lower temperatures. It has also been found that when an amine curing agent and a phenolic curing accelerator are stored in containers that have been opened from time to time, these materials absorb carbon dioxide and water which causes the compositions to become cloudy in appearance as well as altering the reactivity of the components.

In order to overcome the many problems and inconveniences normally heretofore encountered in on-site blending of epoxy resin-forming earth consolidating compositions of the type described, a greatly simplified method has been developed according to this invention.

It is an object of this invention to provide an improved method of preparing an amine cured resin-forming polyepoxide composition for treating a porous earth formation. It is also an object of the invention to provide an improved method for preparing a composition for treating earth formations having wide variations in temperature, premeability and depth. It is also an object of the invention to provide a simplified method of substantially prolonging the producing life of oil wells and improving the permeability of formations to oil.

According to this invention an improved and simplified method for preparing a resin system for oil well sand consolidation is provided. The improvemnt comprises preparing a polyepoxide solution (composition A), a curing agent solution (composition B) and an accelerating agent solution (composition C) the respective solutions each being of approximately constant proportions of ingredients and thereafter mixing together approximately equal portions by volume of the polyepoxide solution and the curing agent solution and a small amount of the accelerating agent solution, the latter added only when necessary depending on the nature of the formation being treated. Regardless of well hole conditions the proportions of ingredients in Compositions A, B and C are approximately constant as is the ratio of amounts of compositions A and B used in the preparation of the composite earth consolidation composition wherein only small amounts of composition C are added depending on the depth and permeability of the formation being treated.

The epoxy resin-forming earth consolidation composition which is blended and injected into the well is prepared by mixing together approximately equal volumes (±20%) of the pre-blended polyepoxide solution (composition A) and the curing agent solution (composition B). The ratio of composition A to composition B mixed to form the consolidation composition is 1:1, but ratios between about 1.2:0.8 and 0.8:1.2 are tolerable.

The polyepoxide used in the consolidation composition is a low molecular weight polyepoxide of epichlorohydrin/2,2 - bis(4 - hydroxyphenyl)propane (bisphenol A) having a formula

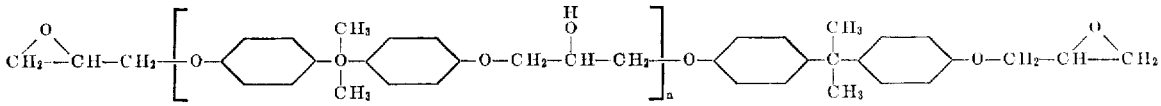

where n is an integer 0, 1, 2, 3, etc. The polyepoxide may be prepared by reacting a dihydric phenol with epichlorohydrin in an alkaline medium. Specific examples of the preparation of the resin of the type used may be found in U.S. Patent No. 2,633,458 the pertinent parts thereof being incorporated herein by reference. The preferred polyepoxide of the type set forth above has a molecular weight of about 350 to 400 and an epoxide equivalent weight of 180–195 (grams of resin containing one gram-equivalent of epoxide).

Composition A is prepared by blending the polyepoxide in a suitable solvent at a polyepoxide concentration of about 24 (±5%) by volume. The solvent should be a hydrocarbon and is preferably a petroleum solvent having an aromatic content of above 80% and up to 100% (the remainder of the solvent being essentially paraffins and/or naphthenes) and having a boiling range of about 300–500° F. A solvent having a lower aromatic content will not have effective solvent properties for the polyepoxide. Thus, the makeup of composition A is about 24 (±5%) of the polyepoxide and about 76 (±5% v.) of suitable aromatic solvent.

The curing agents which may be used with the polyepoxide compositions are cycloaliphatic polyamines where the amino groups are attached directly to the cycloaliphatic ring having from 5 to 7 carbon atoms. They can be prepared by hydrogenating primary and secondary aromatic polyamides having at least two amino hydrogens. Particularly preferred curing agents are 4,4'-diamino-3,3'-dimethyldicyclohexylmethane and 4,4'-diamino dicyclohexylmethane.

Composition B comprises the amine curing agent and a suitable solvent. A suitable solvent for the cycloaliphatic polyamines is one having less aromatic content than that used in the polyepoxide composition A. A desirable solvent composition is a hydrocarbon solvent such as a petroleum solvent having an aromatic content of about 50–70% (the remainder being essentially paraffinic and/or naphthenic) and having a boiling range of about 300–500° F.; it may be a solvent blend. The amount of cycloaliphatic polyamine (4,4'-diamino-3,3'-dimethyldicyclohexylmethane or 4,4'-diamino dicyclohexylmethane) is 12 (±2½%) by volume of composition B, the solvent being the remainder. Thus, the makeup of composition B is about 12 (±2½% v.) of the amine curing agent and about 88 (±2½% v.) of suitable solvent.

Figure 1:
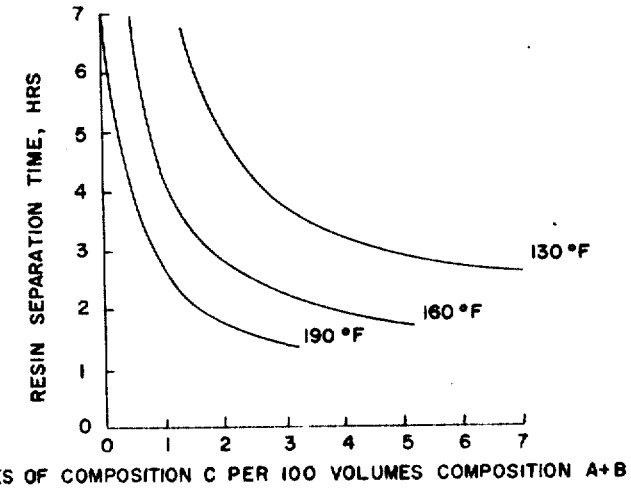
FIGURE 1 shows the effect of phenol curing-accelerator solution content and temperature on the resin formation polyepoxide containing sand consolidation compositions disclosed herein.
Figure 2:
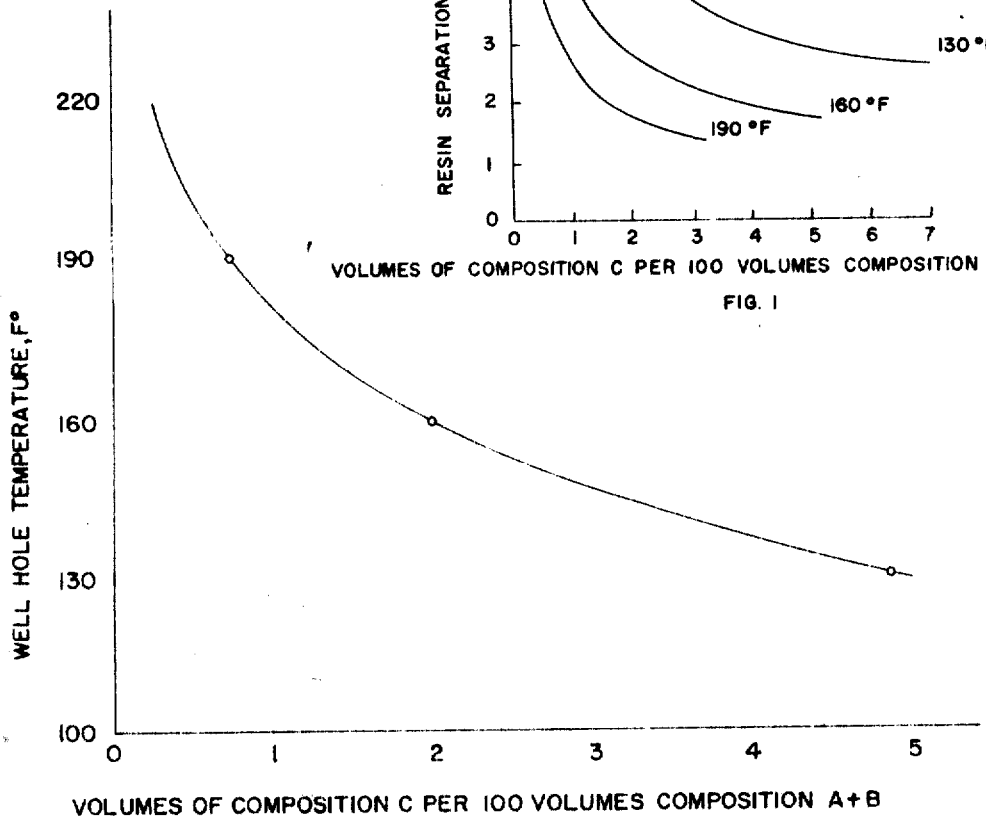
FIGURE 2 shows recommended amounts of phenol curing-accelerator solution (composition C) to be used with varying well hole temperatures for a resin separation time of 2¾ hours.

A third component—composition C is added to the mixture of approximately equal volumes of compositions A and B where necessary depending on the temperature, depth and permeability of the formation. Composition C comprises a curing accelerator and a solvent. The effect of composition C and well temperature on resin separation time is shown in FIGURE 1. For example, for a well bottom temperature of 130° F., about 5% volume of composition C (5 gallons of C per 100 gallons of mixture of composition A and composition B) causes resin separation in about 2¾ hours. FIGURE 2 shows the recommended amounts of composition C to be used with varying well hole temperatures (based on a 2¾ hour resin separation time). At temperatures of about 225° F. and higher no addition of composition C will normally be necessary. Where the well is comparatively quite shallow and has a temperature lower than 130° F., up to 7% of accelerator composition may be necessary.

Composition C is made up of about 50% by weight of a phenolic compound about 50% by weight of a suitable solvent. Any phenolic compound may be used as a cure accelerator. Included are such materials as phenol and alkyl-substituted phenols such as the cresols, tertiary butyl phenol, resorcinol, catechol, thymol, carvacrol, eugenol, hydroquinone, creosol, trinitrophenol, chlorophenol, tridimethylaminomethyl phenol, and the corresponding thiophenols as well as the bis-phenols such as bis(2,2' - dihydroxyphenyl)methane, 2',2-bis(4-hydroxyphenyl)propane, 2,2-bis(4-hydroxyphenyl)butane, 4,4'-dihydroxybenzophenone, bis(4 - hydroxyphenyl)ethane, 2,2-bis(4-hydroxyphenyl)pentane, bis(4 - hydroxyphenyl) butane and the like. Useful phenolic compounds of this type generally have between 6 and about 25 carbon atoms. Phenol is preferred. Another group of phenolic compounds which may be used as accelerators are the A and B stage soluble type phenol-formaldehyde resins.

Suitable solvents for the phenolic compounds used in composition C include the oxygen containing organic solvents. Examples of suitable solvents are ketones such as acetones, methyl ethyl ketone, methyl isobutyl ketone, cyclohexanone, acetophenone, ethers such as diethyl ether, 1,4-dioxane, ether-alcohols such as ethylene glycol monoethyl ether, ethylene glycol monobutyl ether, diethylene glycol monoethyl ether, diethylene glycol monobutyl ether, diethylene glycol diethyl ether, triethylene glycol monoethyl ether, and the like, esters such as ethyl acetate, butyl acetate etc.

The ratio of phenolic compounds to solvent is not critical and may be varied as long as the corresponding equivalent amount of the phenolic compound is added to obtain the desired curing acceleration. The amounts of composition C to be used as set forth herein and in the drawings is based on the convenient 1:1 ratio phenolic compound to solvent. Composition C may be blended with either composition A or B any time prior to the mixing of compositions A and B or it may be kept separate until the earth consolidation composition is formed. It will be appreciated that in any pre-blending of the system, polyepoxide and curing agent must be kept in separate containers to prevent them from reacting. Thus, when the blending of compositions A and B and a properly determined amount of composition C is accomplished just prior to injection into the well, no precipitation of solid resin will occur until the composite composition has been completely injected into the formation.

The blending is accomplished by merely mixing the components. Since the amount of solvent is not varied according to differences of well formation characteristics in any of the three component compositions, it is desirable to pre-blend each of the separate compositions A, B and C prior to being placed at the well site. Thus, each of the three component solutions are easily handled since they are of low viscosity (~3 centipoises at 77° C.), and none undergo phase separation or become too viscous to pour even at 0° F. thereby having a distinct advantage over the individual components (phenol, curing agent and resin) which are very viscous or solid at that temperature. An additional storage advantage afforded by the invention is that the component solution of the curing agent (composition B) and phenolic compound (composition C) do not absorb water and carbon dioxide and are thereby age stable and especially suitable for storage in containers which must be reopened frequently thereby exposing the components to atmospheric conditions.

Prior to injection of the consolidation composition into the well, the formation should be treated in order to remove any substances or materials which might interfere with the curing of the resin, cause fracturing, etc. Thus, it is generally desirable to pre-flush the earth formation prior to injection of the resin forming composition. The first pre-flush material is a readily available hydrocarbon such as diesel oil and the like which will act as a solvent for any undesirable organic materials present within the formation. Kerosene, for example, may also be used.

It will also be desirable to remove any connate water which is present in the formation following the pre-flush. Several types of water-absorbing fluids may be employed. A preferred type of water-absorbing fluid is an oxygen containing hydrocarbon compound having less than 6 carbon atoms per molecule. Alcohols and ketones are examples of the preferred type of water displacing fluid with isopropyl alcohol, n-propyl alcohol, sec-butyl alcohol, acetone, methyl, ethyl ketone and the like being particularly useful.

Generally the water-absorbing fluids affect the rate of reaction. It is, therefore, highly desirable and even essential to prevent the water-absorbing fluid to come in contact with the resin-forming earth consolidation composition. The use of a spacer fluid between the water-absorbing fluid and the consolidation composition will prevent this contact. The spacer fluid should be compatible with both the water-absorbing fluid and the consolidation composition. The spacer fluid is injected into the well following the pre-flush of the water-absorbing fluid, thus effectively forcing the latter, which contains connate water, from the formation to be consolidated. Suitable spacer fluids are, in general, hydrocarbons having the same general composition as the hydrocarbon solvents employed in the polyepoxide containing composition A and the curing composition B. Examples of suitable spacer fluids are medium aromatic oils such as refined solvents in the light gas oil distillation range (400–700° F.). A useful spacer fluid may comprise 10 to 90 parts of a kerosene extract having 80% aromatics the remainder of the fluid being an essentially non-aromatic diesel oil.

Following the spacer fluid treatment the earth consolidating composition is injected into the well. The pre-flush treatment fluids and the consolidating composition are separately pumped down through a string of tubing and into the loose formation to be consolidated in the following sequence: diesel oil (or other hydrocarbon solvent), water-absorbing fluid, spacer fluid, and consolidating composition. The fluid previously in the formation will thereby be displaced or absorbed by the subsequent liquid injected to a great extent. The amount of each of the fluids to be injected into the well depends on the extent of the earth formation to be treated. In general, it has been found that a pre-flush of three pore volumes of diesel oil, three pore volumes of water-absorbing fluid and one pore volume of spacer fluid and one pore volume of consolidating composition is adequate. For an average well with a five foot perforated interval about 1500 gallons each of diesel oil pre-flush and water-absorbing fluid and 500 gallons each of spacer fluid and consolidating composition will be used.

The earth formation consolidation composition prepared according to the invention is pumped into the well after which time the resin is allowed to cure. Generally, curing times are from 8 to 24 hours or more. The risin begins to slowly separate from the solution as a liquid phase, coating each sand grain with a thin, continuous layer of resin which upon further curing and hardening glues them filmly in place. When the reaction is complete the spaces between the sand grains are filled with residual resin solvent which is later displaced by and produced with the crude oil. No post flushing or other treatment of the consolidated formation is necessary.

Where it is desirable to have an indication as to when the resin-forming earth consolidation composition has been properly purged from the injection equipment a suitable colorant may be added which not only visibly identifies the consolidation composition but which will be retained in the solvent phase after resin separation thereby providing means of showing when well production has begun.

Sand formations treated according to this invention develop compressive strengths of over 2000 p.s.i. as well as being unaffected by sour crudes, acids, bases, or alcohols. A particularly unique feature of this resin system is its low resin solids content which separates out of solution on curing leaving only the solvent in the pore spaces. Thus, it is virtually impossible to lose a well through plugging. Since there is such a low resin solids content and only a small portion of the original pore space of a formation to be consolidated is lost through consolidation by this method, the original permeability of the formation is reduced only slightly. The consolidation system described herein is useful for both new or old wells producing gas or oil and is ideally suited for dual completions.

I claim as my invention:

1. A method for treating unconsolidated porous earth formations and forming permeable consolidated earth formations, which comprises:

(a) blending from about 19 to about 29% by volume of a resin forming polyepoxide produced by reacting epichlorohydrin with 2,2'-bis(4-hydroxyphenyl)propane and about 71 to about 81% by volume of a hydrocarbon solvent having an aromatic content above 80%;

(b) blending from about 9½ to about 14½% by volume of a cycloaliphatic polyamine with from about 85½ to about 90½% by volume of a hydrocarbon solvent having an aromatic content of from about 50 to 70%;

(c) mixing blends (a) and (b) in the ratios between about 1.2:0.8 and 0.8:1.2, respectively;

(d) adding to the blended composition prepared by step (c) from 0 to 7% of a solution comprising of about 50% of a phenol and about 50% oxygen-containing organic solvent selected from the group consisting of a ketone, an ether, an ether-alcohol, and an ester;

(e) injecting the bleed resulting from the steps (a), (b) and (c) into said formation; and, (f) retaining said blend in said formation for a time sufficient to consolidate the formation.

2. The method of claim 1 wherein the resin formed in (a) is in the molecular weight range of from 350 to 400, the cycloaliphatic polyamine in (b) being selected from the group consisting of 4,4'-diamino-3,3'-dimethyldicyclohexylmethane and 4,4'-diaminodicyclohexylmethane and the ratio of blends (a) and (b) is 1:1.

3. The method of claim 1 where prior to injecting the consolidating blend according to (e) the unconsolidated formation is pre-flushed with a hydrocarbon liquid.

4. The method of claim 1 where prior to injecting the consolidating blend according to (e) the unconsolidated formation is pre-conditioned by (1) pre-flushing the unconsolidated formation with a liquid hydrocarbon;

(2) injecting into the unconsolidated formation a water-absorbing fluid; and, (3) injecting into the unconsolidated formation a spacer fluid comprised of a liquid hydrocarbon containing aromatics.

References Cited

The following references, cited by the Examiner, are of record in the patented file of this patent or the original patent.

UNITED STATES PATENTS

| | | | |
|---|---|---|---|
| 3,100,527 | 8/1963 | Hilton et al. | 166—33 |
| 3,228,911 | 1/1966 | Rogier | 260—33.6 |

FOREIGN PATENTS

| | | |
|---|---|---|
| 928,127 | 6/1963 | Great Britain. |

STEPHEN J. NOVOSAD, Primary Examiner